United States Patent
Dykstra et al.

(10) Patent No.: US 11,713,511 B2
(45) Date of Patent: Aug. 1, 2023

(54) HIGH POWER WATER ELECTROLYSIS PLANT CONFIGURATION OPTIMIZED FOR SECTIONAL MAINTENANCE

(71) Applicant: KEY DH IP INC./IP STRATEGIQUES DH, INC., Collingwood (CA)

(72) Inventors: Erick S. Dykstra, Clarksburg (CA); Raynald G. LaChance, Levis (CA); Edward D. B. Stuart, Ravenna (CA); Andrew T. B. Stuart, Ravenna (CA)

(73) Assignee: KEY DH IP INC./IP STRATEGIQUES DH, INC., Collingwood (CA)

( * ) Notice: Subject to any disclaimer, the term of this patent is extended or adjusted under 35 U.S.C. 154(b) by 0 days.

(21) Appl. No.: 17/510,997

(22) Filed: Oct. 26, 2021

(65) Prior Publication Data

US 2022/0220620 A1    Jul. 14, 2022

Related U.S. Application Data

(60) Provisional application No. 63/105,587, filed on Oct. 26, 2020.

(51) Int. Cl.
*C25B 1/04* (2021.01)
*C25B 9/65* (2021.01)
(Continued)

(52) U.S. Cl.
CPC .................. *C25B 1/04* (2013.01); *C25B 1/50* (2021.01); *C25B 9/65* (2021.01); *C25B 9/66* (2021.01); *C25B 15/08* (2013.01)

(58) Field of Classification Search
CPC ........ C25B 1/04–044; C25B 9/66; C25B 9/65
See application file for complete search history.

(56) References Cited

U.S. PATENT DOCUMENTS 1,597,552 A     8/1926  Stuart
3,067,123 A *  12/1962  Huber .................... C25D 21/12
                                                324/443
(Continued)

OTHER PUBLICATIONS

Junbo et al, Hydrogen isotope separation by cryogenic gas chromatography using the combined column of 5 Å molecular sieve and Al2O3, International Journal of Hydrogen Energy, vol. 31, No. 14, Nov. 2006, pp. 2131-2135 (Year: 2006).*

(Continued)

*Primary Examiner* — Harry D Wilkins, III
(74) *Attorney, Agent, or Firm* — Forsgren Fisher McCalmont DeMarea Tysver LLP; James M. Urzedowski; Daniel A. Tysver

(57) ABSTRACT

The present disclosure provides a high-power unipolar water electrolysis plant including a rectifier, a first U-bank, and a second U-bank electrically connected in series to the rectifier and to the first U-bank. Each U-bank is formed by a pair of adjacent, longitudinal cell arrays electrically connected to each other. The cell arrays are arranged in a spaced apart, side-by-side arrangement with a service corridor defined therebetween to allow sectional maintenance to be performed on each cell array. Each cell array has a plurality of unipolar water electrolyser cells. Each U-bank has input conduits for delivering water and cooling water to each cell array, output conduits for carrying hydrogen gas, oxygen gas and cooling water away from each cell array. The high-power unipolar water electrolysis plant includes a first jumper and a second jumper to isolate the U-bank, an electrical bypass busbar extension and a third jumper to bypass the U-bank.

8 Claims, 9 Drawing Sheets

(51) Int. Cl.
*C25B 1/50* (2021.01)
*C25B 15/08* (2006.01)

(56) References Cited

U.S. PATENT DOCUMENTS

| | | | | |
|---|---|---|---|---|
| 3,930,978 | A * | 1/1976 | Strewe | C25B 9/66 204/267 |
| 4,078,984 | A * | 3/1978 | Strewe | C25B 9/66 204/267 |
| 4,324,634 | A * | 4/1982 | Kircher | C25B 9/66 204/267 |
| 4,333,804 | A * | 6/1982 | Saito | C25B 15/00 205/535 |
| 4,390,763 | A * | 6/1983 | Hruda | H01H 33/002 204/267 |
| 4,421,614 | A * | 12/1983 | Yamaguchi | C25B 15/00 205/347 |
| 4,482,448 | A | 11/1984 | Bowen | |
| 4,490,231 | A | 12/1984 | Boulton | |
| 4,589,966 | A * | 5/1986 | Ford | C25B 9/66 205/345 |
| 4,696,730 | A * | 9/1987 | Chaffy | C25C 3/16 204/247.1 |
| 4,713,161 | A * | 12/1987 | Chaffy | C25C 3/16 204/247.1 |
| 5,207,883 | A * | 5/1993 | Borrione | C25B 9/66 204/267 |
| 5,346,596 | A * | 9/1994 | Borrione | H01H 33/002 205/770 |
| 6,080,290 | A | 6/2000 | Stuart | |
| 2007/0089997 | A1 * | 4/2007 | Depalo | C25B 9/17 205/335 |
| 2016/0200573 | A1 * | 7/2016 | Yokota | C01B 5/00 423/580.1 |
| 2016/0281248 | A1 * | 9/2016 | Hahn | C25B 9/65 |
| 2020/0220185 | A1 * | 7/2020 | Ma | C25B 1/04 |
| 2022/0372637 | A1 * | 11/2022 | Barratt | C25B 15/02 |

OTHER PUBLICATIONS

R. L. Leroy and A.K. Stuart, "Advanced Unipolar Electrolysis", journal, Jun. 6, 1981, vol. 6, No. 6, pp. 589-599, International Association for Hydrogen Energy.

R. L. Leroy, "Industrial Water Electrolysis: Present and Future", journal, Oct. 29, 1982, vol. 8, No. 6, pp. 401-417, International Association for Hydrogen Energy.

* cited by examiner

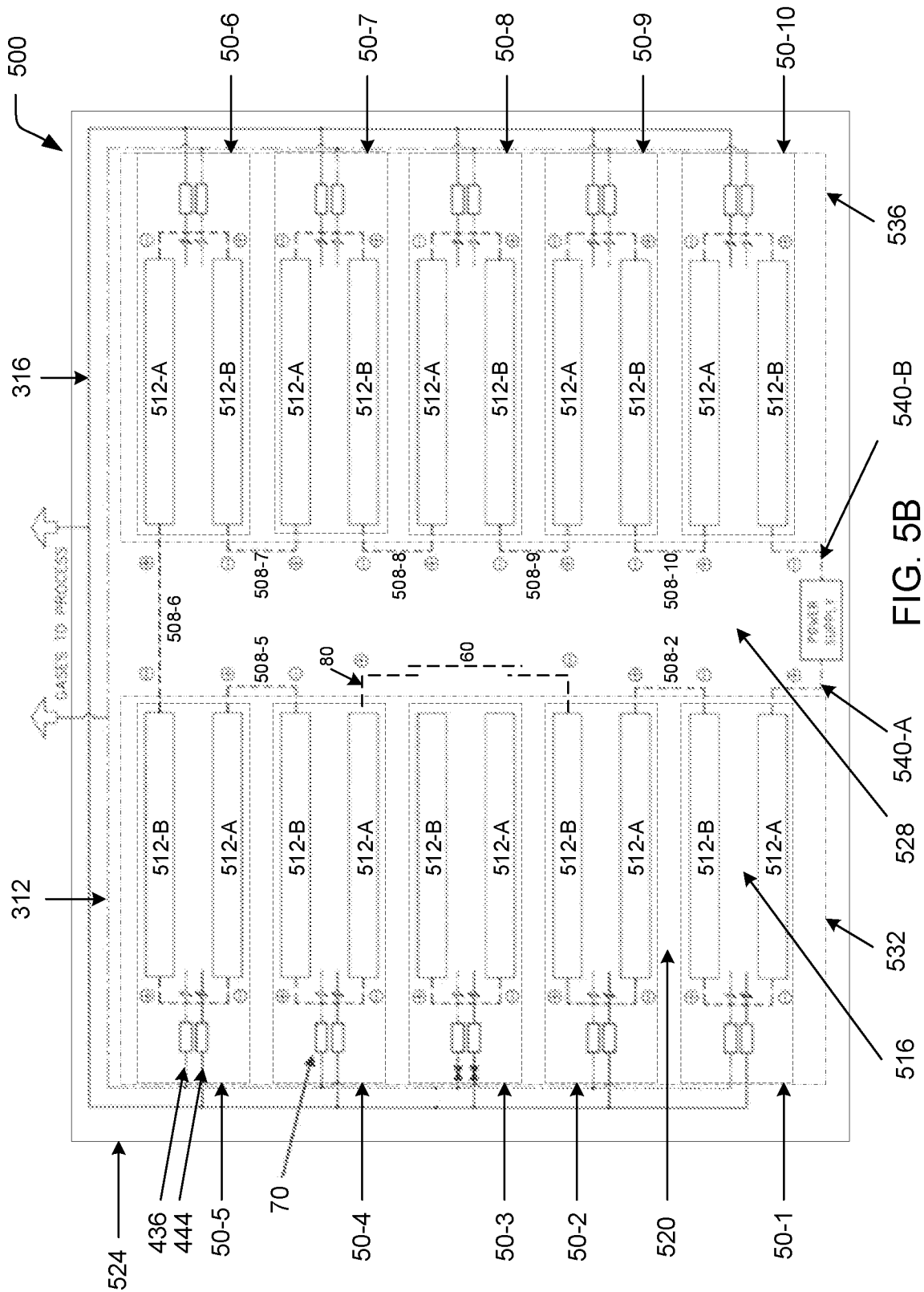

HIGH POWER WATER ELECTROLYSIS PLANT CONFIGURATION OPTIMIZED FOR SECTIONAL MAINTENANCE

CROSS-REFERENCE TO RELATED APPLICATIONS

This application is a utility application claiming priority to U.S. Provisional Application 63/105,587, filed on Oct. 26, 2020, the entire contents of which I incorporated herein by reference.

FIELD OF INVENTION

This disclosure relates to a novel, high power hydrogen production plant using unipolar alkaline water electrolysers configured in such a way so that sectional maintenance can be optimized.

BACKGROUND OF THE INVENTION

Electrochemical cell technology is designed such that an applied electric current induces reactions within a cell, converting available reactants into desired products. An electrolytic cell, or electrolysis cell, is one preferred method of accomplishing this conversion. Electrolysis cells require the conduction of electricity, typically direct current, from an external source to a polarized electrode. They further require conduction away from an electrode of the opposite polarity, either external to or within the electrochemical cell, to generate products.

One desirable configuration of an electrochemical cell is that of the filter press-type electrolyser. Filter press electrolyser electrochemical cells require: mechanical frames with sufficient rigidity, the ability to be connected to (and removed from) an external current source, a "current carrier" to provide a current flow path for electricity to be conducted to the electroactive area, a circulation chamber to provide space for gaseous product generation at the electroactive area, passageways that allow the input and output of reactants and products, and finally a capability to form an external seal that prevents fluids leaking from the interior of the cell to the external atmosphere.

Filter press electrolyser electrochemical cells generally come in three configurations, driven by the design of their sub-components: a bipolar cell design, a unipolar cell design, or a monopolar cell design.

Monopolar Cell Design

A "monopolar" cell design or configuration refers to an electrochemical device based upon a current carrying configuration. This monopolar configuration comprises a current carrying structure, and further provides an electroactive structure of a singular polarity (either anodic or cathodic) on one side of the current carrying structure. As a result, a region of one polarity is provided on the side of the current carrying structure that possesses the electroactive structure. Current is provided into the configuration by a power source and flows in across the current carrier and to the electroactive structure. Typically, the current flows in a parallel direction to the electroactive structure. A half-cell creates the base current carrying unit for a monopolar electrochemical filter press device constructed of positive and negative (anodic and cathodic) half-cell pairs. All monopolar base current carrying units are configured electrically in parallel within a single filter press arrangement, such that one electrochemical cell is formed within a single filter press stack.

Bipolar Cell Design

The phrase "bipolar configuration" or "bipolar cell configuration" refers to an electrochemical device based upon a current carrying configuration. This bipolar configuration comprises a bipolar wall, defining electroactive areas of opposite polarity on opposing sides of the current carrying structure. Regions of opposite polarity are provided on the opposing sides of the bipolar wall. Current is provided into the configuration by a power source and flows through the bipolar wall orthogonally, creating the base current carrying unit for a bipolar electrochemical filter press device. Multiple electrochemical cells within a bipolar filter press are electrically connected in series, with each individual current carrier typically comprising one anodic and one cathodic side connected by a conductive bipolar wall. The current path in bipolar cells between electroactive structures of different polarities is typically shorter than the equivalent current path in traditional monopolar designs and unipolar designs as described later.

In bipolar cells, the current must only travel through one bipolar wall to reach an electroactive structure of the opposing polarity, whereas in traditional unipolar and monopolar cells additional components are required to connect current to opposite polarity electroactive structures. A shorter current path generally creates lower resistance parameters within the conductive surfaces of a singular cell. This has traditionally led to higher voltage losses due to higher electronic resistance voltage loss, and thus lower efficiency, for unipolar and monopolar cells as compared to bipolar cells for similar current densities and similar electroactive structures.

Historically, the contribution of electronic resistance to cell voltage losses in traditional unipolar and monopolar designs presented the greatest barrier to the continued commercialization of these technologies. When choosing which direction to take electrolysis technologies in recent decades, leaders in the electrolysis field focused heavily on the advancement of "zero-gap" bipolar cell designs as they reduced the contribution of electronic resistance to cell voltage losses and consequently, for similar current densities and similar electroactive structures, improved plant energy efficiency. Zero-gap designs also allowed bipolar cells to utilize higher current densities. The focus on zero-gap, or near zero-gap, bipolar technology led to an industrial preference for bipolar technology as a whole over monopolar and unipolar technology. However, the utilization of higher current densities does not in itself lead to improved efficiency or improved plant economics. Unipolar and monopolar technologies present many complementary advantages in these areas, which will be discussed further.

In addition, in numerous bipolar filter press designs the electrolyte is shared amongst cells within the same filter press and exposed to the full potential gradient of all the individual electrolytic cells that comprise the bipolar filter press. This leads to rapid depolarization upon removal of the forward current, bypass currents during normal operation, and exposure to high potential differences leading to a need for choice of materials able to withstand this environment.

Unipolar Cell Design

A unipolar cell design or configuration refers to an electrochemical device based upon a current carrying configuration. This unipolar configuration comprises a current carrying structure that provides multiple electroactive structures of the same polarity (either anodic or cathodic) on opposing sides of the current carrying structure. As a result, regions of the same universal polarity are provided on the opposing sides of the current carrying structure. Current is then provided by a power source and flows in across the current carrier and to the electroactive structures. Typically, the current flows in a parallel direction to the electroactive structures. The half-cell creates the base current carrying unit for a unipolar electrochemical filter press device constructed of positive and negative (anodic and cathodic) half-cell pairs. Like the previously described monopolar base current carrying unit, all unipolar base current carrying units are configured electrically in parallel within a single filter press arrangement, such that one electrochemical cell is formed within a single filter press stack. Unipolar designs are distinguished from monopolar designs by the presence and positioning of their electroactive area(s) and the structure of their current carrier(s) among other things.

Historically, unipolar cells for alkaline water electrolysis were popularized in a "tank type" configuration. An early tank type unipolar electrolyser is described in U.S. Pat. No. 1,597,552, Electrolytic Cell, Alexander T. Stuart, 1923. A major advancement in tank type unipolar electrode design as described in U.S. Pat. No. 4,482,448, Electrode Structure for Electrolyser Cells, Bowen et al, 1981 introduced the world to large scale hydrogen production from non-fossil energy, the electrolyser design being configured for large total surfaces areas and currents of 120,000 amperes per cell. However, because of the high part count, complex assemblies, resistance within the conductive pathways of a single cell, and difficulties inherent in changing the surface area per cell, "tank type" unipolar water electrolysers, such configurations were generally replaced by comparatively more efficient "filter press type" configurations over time. However, these "tank type" designs eliminated need for mixing electrolyte between cells and the related by-pass currents and very high potential differences across multicell arrays. This generally enabled low costs materials which are stable for over 30 years of operation. These include use of low carbon steel without surface treatments or light nickel plating on carbon steel.

Proposed layouts of larger hydrogen production plants using the Electrolyser Inc. Generation I and II cell designs are found in Advanced Unipolar Electrolysis, R. L. LeRoy and A. K. Stuart, 1981. The large-scale designs include several rows of electrolyser cell blocks or cell which consist of several unipolar water electrolysers. Each cell block is electrically connected to the preceding cell block by a substantially u-shaped connection, to thereby form a U-bank. The difference between the large-scale hydrogen production plant using the Generation I cells and the Generation II cells is the floor space size requirement needed to house the cell blocks. Advancements in electrolyser technologies have reduced the facility space from 3020 m$^2$ using the Generation I cells to 900 m$^2$ using the Generation II cells, while continuing to maintain the production of hydrogen and general U-bank arrangement. Additionally, a 100-MW large scale hydrogen production plant using unipolar electrolysers was designed and shown as a schematic in Industrial Water Electrolysis: Present and Future, R. L. LeRoy, 1982).

This large-scale production plant was modelled after a smaller experimental plant of 600-kW in Varennes, Quebec also using the Generation II advanced unipolar electrolyser.

In both the Advanced Unipolar Electrolysis and the Industrial Water Electrolysis: Present and Future papers, although discussing preliminary designs of large-scale hydrogen production plants using unipolar electrolysers, there is little consideration given to how plant operations would proceed given a routine maintenance check, diaphragm replacement, cell overhaul or technical complications due to improper maintenance. Examples of such complications due to improper maintenance could include poor gas purities, overheating, internal cell shortage, caustic leakage or a sudden increase or decrease in cell voltage. For instance, after 25 years of operation, diaphragm replacements may be required. Replacement of one cell block would require the shutdown of the entire plant ceasing the production of hydrogen completely while the individual cell block is removed. Additionally, complete purging of the plant would be required before and after the removal of the cell block. This would lead to additional costs and additional time wasted, as there would be plant downtime and a loss of hydrogen and oxygen production. It would be preferable to be able to perform maintenance without significantly interfering operations.

SUMMARY OF THE INVENTION

The present disclosure provides a high-power unipolar water electrolysis plant including a rectifier for supplying DC current, a first U-bank electrically connected to the rectifier, and a second U-bank electrically connected in series to the rectifier and to the first U-bank. Each U-bank is formed by a pair of adjacent, first and second longitudinal cell arrays electrically connected to each other. The first and second cell arrays are arranged in a spaced apart, side-by-side arrangement with a service corridor defined therebetween to allow sectional maintenance to be performed on each cell array. The first cell array is disposed on one side of service corridor and the second cell array is disposed on the other side of the service corridor. Each cell array has a plurality of unipolar water electrolyser cells. In addition, each U-bank has input conduits for delivering feed water and cooling water to the plurality of unipolar water electrolyser cells of each cell array, output conduits for carrying hydrogen gas, oxygen gas and cooling water away from the plurality of unipolar water electrolyser cells of each cell array and valving for isolating flow from the output conduits and the input conduits during maintenance of each cell array.

In addition, the high-power unipolar water electrolysis plant includes a first jumper being connectable upstream of the first cell array of the first U-bank for electrically isolating the first cell array of the first U-bank, a second jumper being connectable downstream of the second cell array of the first U-bank for electrically isolating the second cell array of the first U-bank, an electrical bypass busbar extension being connectable upstream of the first jumper and downstream of the second jumper for completing the circuit in the high-power water electrolysis plant when the first U-bank is isolated, and a third jumper cooperating with the electrical bypass busbar extension and being operable to redirect the DC current away from the first U-bank toward the remainder of the high-power water electrolysis plant when the first U-bank is isolated.

In addition, the power supply may be a rectifier, a rectifier system, solar panels or other direct power generating source connections. The rectifier system comprises a plurality of rectifiers electrically connected in parallel.

Where the power supply is a rectifier, the rectifier is configured to permit its amperage output to be increased to compensate for between 5% to 50% of any reduced hydrogen production output on account of the isolation of one of the first and second U-banks during maintenance.

In one embodiment, the high-power unipolar water electrolysis plant has a first U-bank and the second U-bank that have the same or substantially the same hydrogen production capacity.

Alternatively, the first U-bank and the second U-bank have different hydrogen production capacities.

Alternatively, the first cell array of the first U-bank has the same or substantially the same hydrogen production capacity as the second cell array of the first U-bank.

Alternatively, the first cell array of the first U-bank has a different hydrogen production capacity than the second cell array of the first U-bank.

Furthermore, each cell array of the first U-bank may be configured to receive between 2 MW and 125 MW of power to produce hydrogen.

Alternatively, the first cell array of the second U-bank has the same or substantially the same hydrogen production capacity as the second cell array of second U-bank.

Alternatively, the first cell array of the second U-bank has a different hydrogen production capacity than the second cell array of the second U-bank.

Each cell array may include between 2 and 100 unipolar electrolyser cells.

The first cell array of the first U-bank has a first end connected to the adjacent U Bank and a second end connected to one of the power supply or another U-bank.

In addition, the first U-bank is disposed parallel or substantially parallel to the second U-bank with a service corridor formed therebetween.

Furthermore, the first cell array of the first U-bank is disposed parallel or substantially parallel to the second cell array of the first U-bank.

The first and second jumpers are selected from the group consisting of switches and busbar segments.

The input conduits of the first U-bank may include a feed water input conduit having a first branched portion in fluid communication with the first cell array and a second branched portion in fluid communication with second cell array, and a cold water input conduit having a first branched portion in fluid communication with the first cell array and a second branched portion in fluid communication with second cell array.

Alternatively, the input conduits may include having first feed water input conduit in fluid communication with the first cell array, a second feed water input conduit in fluid communication with the second cell array, a first cold water input conduit in fluid communication with the first cell array and a second cold water input conduit in fluid communication with the second cell array.

In addition, the valving includes a first input valve connected to the first feed water input conduit upstream of the first cell array, a second input valve connected to the first cold water input conduit upstream of the first cell array, a third input valve connected to the second feed water input conduit upstream of the second cell array, and a fourth input valve connected to the second cold water input conduit upstream of the second cell array.

The output conduits of the first U-bank may include a first hydrogen gas output conduit in fluid communication with the first cell array, a second hydrogen gas output conduit in fluid communication with the second cell array, a first oxygen gas output conduit in fluid communication with the first cell array, a second oxygen gas output conduit in fluid communication with the second cell array, a first cooling water output conduit in fluid communication with the first cell array and a second cooling water output conduit in fluid communication with the second cell array.

In addition, the valving includes a first output valve connected to the first cooling water output conduit downstream of the first cell array, a second output valve connected to the first oxygen gas output conduit downstream of the first cell array, a third output valve connected to the first hydrogen gas output conduit downstream of the first cell array, a fourth output valve connected to the second cooling water output conduit downstream of the second cell array, a fifth output valve connected to the second oxygen gas output conduit downstream of the second cell array and a sixth output valve connected to the second hydrogen gas output conduit downstream of the second cell array.

The first U-bank may further include a first water seal connected to the first oxygen gas output conduit and the first hydrogen gas output conduit upstream of the second and third output valves, a second water seal connected to the second oxygen gas output conduit and the second hydrogen gas conduit upstream of the fifth and sixth output valves.

The first U-bank may further include a first vent exhaust for venting oxygen from the first oxygen water seal, a second vent exhaust for venting hydrogen gas from the first hydrogen water seal, a third vent exhaust for venting oxygen gas from the second oxygen water seal, and a fourth vent exhaust for venting hydrogen gas from the second hydrogen water seal.

The first U-bank may further include a first mist eliminator connected to the first oxygen gas output conduit upstream of the second output valve, a second mist eliminator connected to the first hydrogen gas output conduit upstream of the third output valve, a third mist eliminator connected to the second oxygen gas output conduit upstream of the fifth output valve, and a fourth mist eliminator connected to the second hydrogen gas output conduit upstream of the sixth output valve.

The first U-bank may further include a first isotope (deuterium) enrichment column connected to the first oxygen gas output conduit upstream of the second output valve, a second isotope (deuterium) enrichment column connected to the first hydrogen gas output conduit upstream of the third output valve, a third isotope (deuterium) enrichment column connected to the second oxygen gas output conduit upstream of the fifth output valve, and a fourth isotope (deuterium) enrichment column connected to the second hydrogen gas output conduit upstream of the sixth output valve.

The present disclosure also provides a high-power unipolar water electrolysis plant including a power supply for supplying DC current, a first plurality of U-banks electrically connected to the power supply, and a second plurality of U-banks electrically connected in series to the power supply and to the first plurality of U-banks. Each U-bank of the first and second plurality is formed by a pair of adjacent, first and second longitudinal cell arrays electrically connected to each other and arranged in a spaced apart, side-by-side arrangement with a service corridor defined therebetween to allow sectional maintenance to be performed on each cell array. The first cell array is disposed on one side of service corridor and the second cell array being disposed on the other side of the service corridor, each cell array having a plurality of unipolar water electrolyser cells, and each U-bank of the first and second plurality having input conduits for delivering feed water and cooling water to the plurality of unipolar water electrolyser cells of each cell array, output conduits for carrying hydrogen gas, oxygen gas and cooling water away from the plurality of unipolar water electrolyser cells of each cell array and valving for isolating flow from the output conduits and the input conduits during maintenance of each cell array.

In addition, high-power unipolar water electrolysis plant may include a first jumper being connectable upstream of the first cell array of a first U-bank of one of the first or second plurality of U-banks for electrically isolating the first cell array of the first U-bank, a second jumper being connectable downstream of the second cell array of the first U-bank for electrically isolating the second cell array of the first U-bank, an electrical bypass busbar extension being connectable upstream of the first jumper and downstream of the second jumper for completing the circuit in the high-power unipolar water electrolysis plant when the first U-bank is isolated, a third jumper cooperating with the electrical bypass busbar extension and being operable to redirect the DC current away from the first U-bank toward the remainder of the high-power unipolar water electrolysis plant when the first U-bank is isolated.

The high-power unipolar water electrolysis plant may include the first plurality of U-banks and the second plurality of U-banks being disposed on either side of a central space defined within the plant.

The first plurality of U-banks is laid out according to a first arrangement and the second plurality of U-banks is laid out according to a second arrangement, the first and second arrangements being identical to each other.

The high-power unipolar water electrolysis plant is configured to receive between 5 MW and 2 GW of power to produce hydrogen.

The high-power unipolar water electrolysis plant is configured to receive between 5 MW and 100 MW of power to produce hydrogen.

The high-power unipolar water electrolysis plant is configured to receive between 100 MW and 500 MW of power to produce hydrogen.

Alternatively, the high-power unipolar water electrolysis plant may be a high-power monopolar water electrolysis plant.

The present disclosure also provides a method of isolating a U-bank in a high power water electrolysis plant having a plurality of u-banks connected in series to a DC power supply. Each U-bank is formed by a pair of adjacent, first and second longitudinal cell arrays electrically connected to each other and arranged in a spaced apart, side-by-side arrangement to allow sectional maintenance to be performed on each cell array. Each cell array has a plurality of unipolar water electrolyser cells. The method of isolating a U-bank in a high power water electrolysis plant includes powering down the high power water electrolysis plant, fluidly isolating the u-bank from feed water and cooling water inputs and hydrogen gas and oxygen gas outputs, electrically isolating the first cell array of the u-bank to be isolated, electrically isolating the second cell array of the u-bank to be isolated, actuating a bypass circuit provided to the high-power water electrolysis plant, and powering up the high power water electrolysis plant, thereby allowing DC current to be redirected away from the U-bank to be isolated toward the remainder of the high-power water electrolysis plant.

Fluidly isolating the U-bank further includes closing valves on a plurality of input conduits associated with the u-bank to be isolated so as to prevent the input conduits from supplying feed water and cooling water inputs to each u-bank.

Alternatively, fluidly isolating the U-bank further includes flushing out all hydrogen and oxygen gas from the U-bank to be isolated by introducing a purging gas to the U-bank to be isolated, and venting hydrogen and oxygen gas out of a vent exhaust.

Alternatively, fluidly isolating the U-bank further includes closing valves on a plurality of output conduits associated with the u-bank to be isolated so as to prevent any backflow of hydrogen and oxygen gas through the output conduits.

Electrically isolating the first cell array of the U-bank to be isolated further includes actuating a first jumper connected upstream of the first cell array of the U-bank to be isolated.

Electrically isolating the second cell array of the U-bank to be isolated further includes actuating a second jumper connected downstream of the second cell array of the U-bank to be isolated.

Actuating a bypass circuit provided to the high-power water electrolysis plant further includes connecting an electrical bypass busbar extension upstream of the first jumper and downstream of the second jumper, and actuating a third jumper cooperating with the electrical bypass busbar extension to complete the circuit in the high-power water electrolysis plant.

The method of isolating a U-bank in a high power water electrolysis plant may also include increasing the amount of power from the DC power supply to compensate for the loss in production in high power water electrolysis plant following the fluid and electrical isolation of u-bank to be isolated.

The embodiments of the present invention shall be more clearly understood with reference to the following detailed description of the embodiments of the invention taken in conjunction with the accompanying drawings.

BRIEF DESCRIPTION OF THE SEVERAL VIEWS OF THE DRAWINGS

FIG. 5B depicts a schematic top plan view of the large scale unipolar alkaline water electrolyser plant of FIG. 5A provided with a single electrical bypass circuit.

DETAILED DESCRIPTION OF THE PREFERRED EMBODIMENTS OF THE INVENTION

Figure 1:
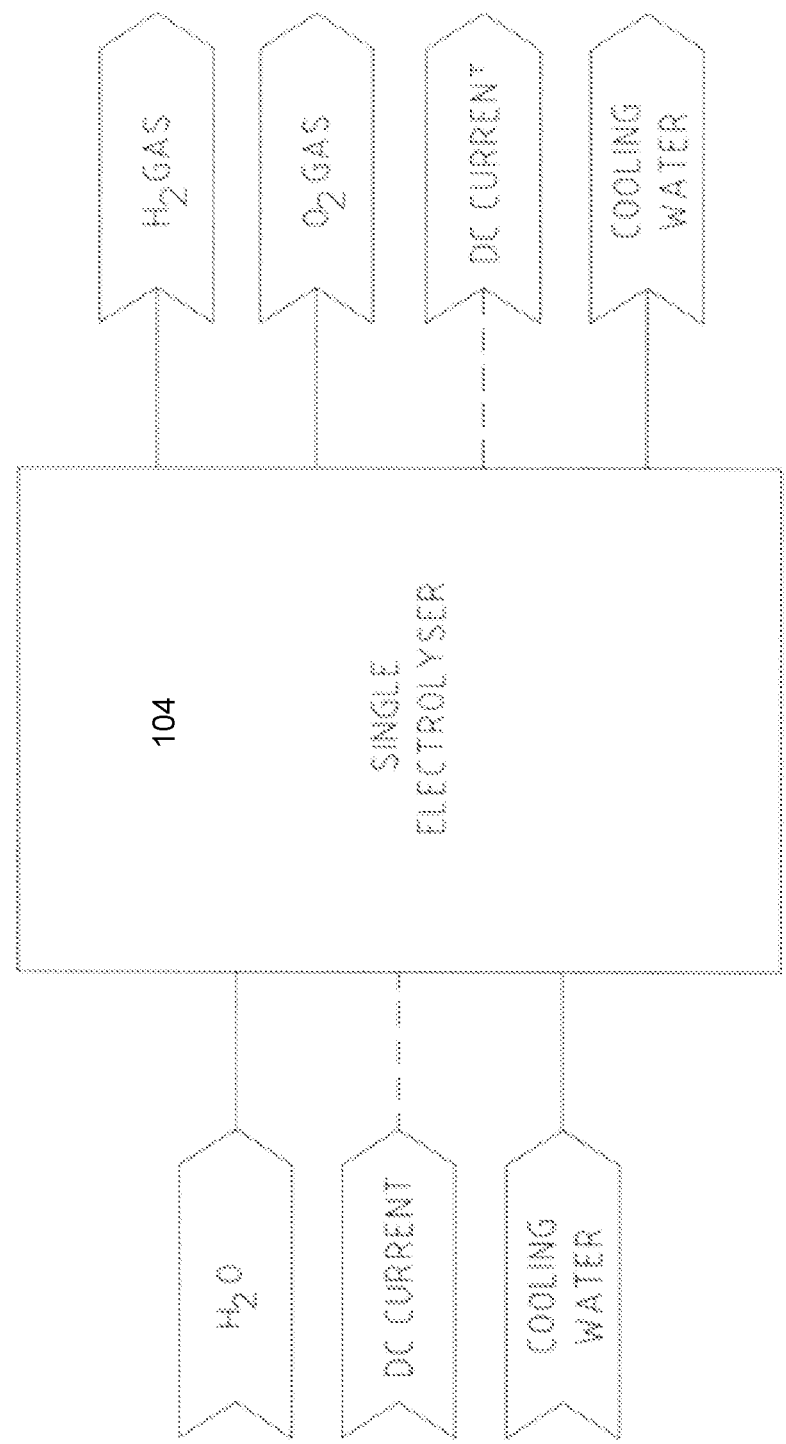
FIG. 1 depicts a block diagram of a unipolar alkaline water electrolyser cell showing input reactants entering and resultant products leaving the unipolar electrolyser cell with DC power flowing therethrough to allow for continuous operation and production of hydrogen and oxygen gas.

Various embodiments and aspects of the disclosure will be described with reference to details discussed below. The following description and drawings are illustrative of the disclosure and are not to be construed as limiting the disclosure. The figures are not to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

As used herein, the terms "generally" and "essentially" are meant to refer to the general overall physical and geometric appearance of a feature and should not be construed as preferred or advantageous over other configurations disclosed herein.

Unipolar water electrolysis plants have generally been designed with the ability to remove a single unipolar cell from an array of cells. Procedures related to replacement of single unipolar electrolyser cells are known.

With the advent of very large-scale hydrogen production system incorporating unipolar water electrolyser cells, the size of an individual array of electrolyser cells could reach 1,000 individual cells connected together through external bus bars to a single power supply. For example, if each cell operated at 2 volts, and 1,000 cells were connected electrically in series, then the single system would be 2,000 volts. In such an embodiment, if the current flowing through the unipolar electrolyser cells were 250,000 amperes, then a 500 MW single hydrogen plant would be created. In low power—(e.g., less than 20 MW) unipolar water electrolysis based hydrogen production systems, isolation of individual cells is adequate and does not impede the output of manufacturing significantly as the absolute number of water electrolysis cells is a relatively low number. For example, only 40 cells would be required. For example, four spare cells could be held ready for substitution and readily replace four operating cells in need of maintenance. To retrofit the entire facility would require 10 shut down and start up procedures which may be quite acceptable over a 30 plus year plant life. However, isolation of individual cells for maintenance purposes may impact the output of manufacturing significantly in large-scale hydrogen production systems which incorporate many hundreds of water electrolysis cells. This would lead to more frequent shutdowns for maintenance of the entire plant. The present invention relates to large-scale unipolar water electrolysis plant designs with the ability to perform sectional maintenance by dividing the population of cells into two or more segments, called U-banks, which can allow isolation not just of a single cell, but also a larger portion of the plant. Sectional maintenance in a high-power unipolar electrolysis plant is advantageous as it allows for electrically isolating U-banks to perform sectional maintenance while allowing other U-banks to continue to receive current and allowing the remainder of the plant to continue to operate.

A large-scale unipolar alkaline water electrolyser hydrogen production plant is configured using a single circuit electrical system and a high current, high voltage power supply (i.e. rectifier, solar cells or other direct power generating source connections) favoured by hydrogen plants, such that sections of the hydrogen plant can be isolated without surrendering the benefit of a single electrical circuit or a significant loss in production.

As will be discussed further below, this design features blocks of cells, or cell arrays which consist of several unipolar water alkaline electrolyser cells wherein each cell array is connected alongside one another utilizing an electrical connection at one end of the two cell arrays to form a U-bank. Said U-bank consists of two cell arrays connected within a single circuit. With this U-bank configuration, an electrical bypass circuit can be implemented enabling the electrical isolation of a single U-bank, or pair of cell arrays. Isolation allows the individual U-bank to undergo maintenance while the remaining U-banks continue operation and hydrogen production.

Maintenance of a cell array may be due to various reasons, including, but not limited to maintenance checks, preventative part replacements, diaphragm replacement, or cell overhaul. For instance, diaphragm replacements are generally required after 20 to 25 years of operation. To perform this replacement without the present invention would require a plant shutdown and a purging of either the cell array containing said cell for maintenance or even the entire plant of all gases and liquids, ceasing all operations and production of hydrogen until the electrolyser cells requiring the replacement has been successfully completed With the present invention, it is possible to quickly isolate and bypass the U-bank with the affected electrolyser cell from the entirety of the plant, allowing for maintenance to be performed while the remainder of the plant continues operations. It is also possible to purge only the isolated U-bank, saving costs and lessening the waste of hydrogen and oxygen. In addition, where a determination to undertake maintenance of the entire hydrogen generation plant, sectional maintenance can allow most or all cells in each section to undergo maintenance without causing a long term shutdown of the entire hydrogen plant.

Figure 5A:
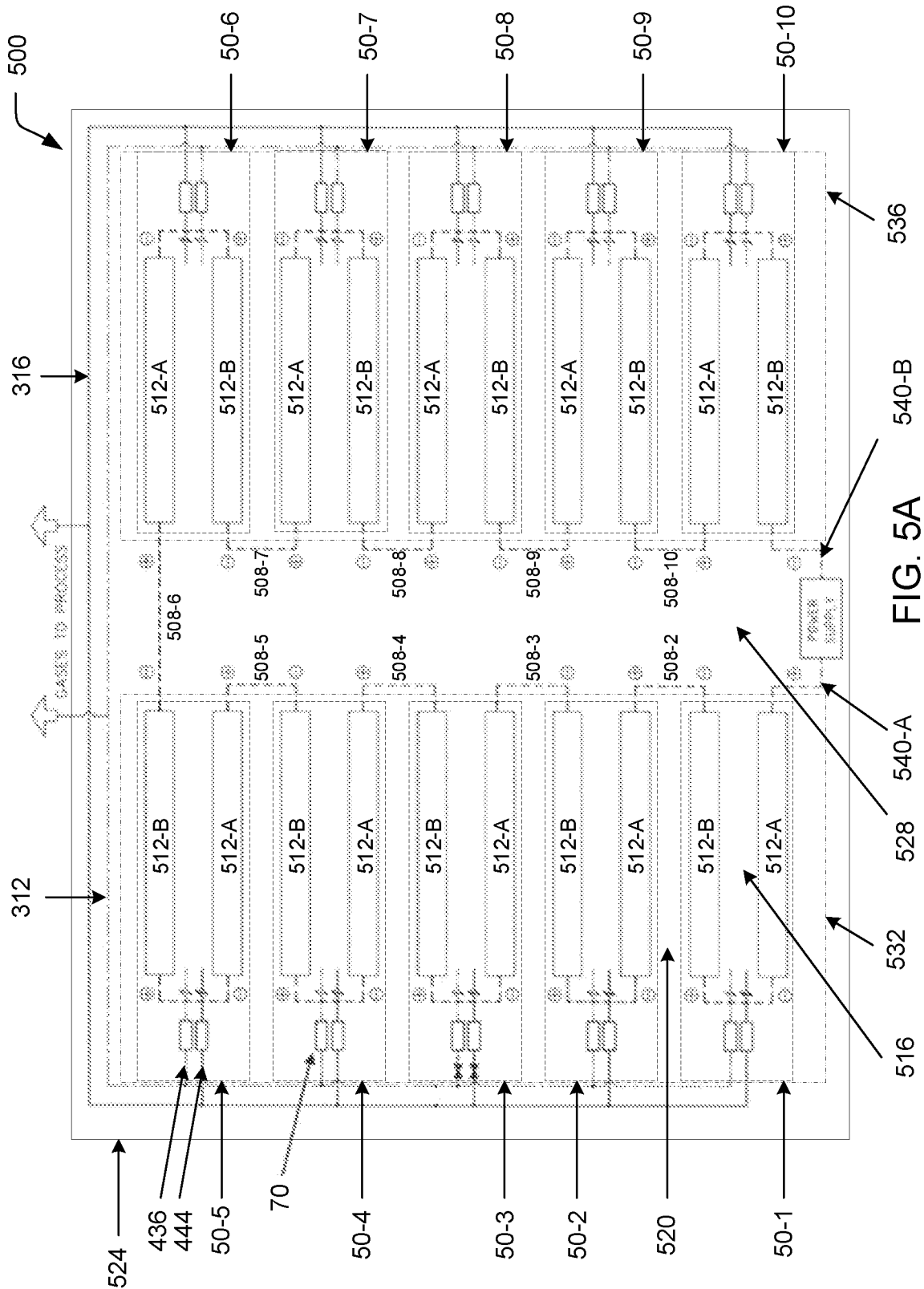
FIG. 5A depicts a schematic top plan view of a large scale unipolar alkaline water electrolyser plant comprising several U-banks electrically connected to a rectifier/power supply.

In addition, another advantage of the present invention is that the number of U-banks can be structured so that a specific percentage of the unipolar plant can be isolated for the purpose of sectional maintenance. At a minimum, two U-banks are required. While any number of U-banks may be employed, it is believed that most applications will utilize between 2 to 20 U-banks, and more preferably between 4 to 10 U-banks. Preferably, the operator should have the ability to isolate between 10% and 50% of the plant for maintenance while still operating the remaining portion of the plant. However, this could vary (more or less) in specific implementations. FIG. 5A depicts a large-scale unipolar alkaline water electrolyser hydrogen production plant 500 (also referred to herein as high-power unipolar electrolysis plant 500). In some embodiments, the high-power unipolar electrolysis plant is capable of accommodating 5 MW to over 2 GW which it uses to generate hydrogen. Preferably, large high-power unipolar electrolysis plants may be configured to receive 100 MW to 500 MW, whereas smaller plants could be configured to receive 5 MW to 100 MW.

In FIGS. 5A and 5B, the high-power unipolar electrolysis plant 500 is shown to have a rectangular or substantially rectangular footprint 524 (also referred to herein as floorplan 524). This is for illustration purposes only. A person skilled in the art will appreciate that the unipolar electrolysis plant can have any suitably-shaped footprint or floorplan. Laid out within the footprint 524 is a first series or plurality 532 of U-banks 50 and a second series or plurality 536 of U-banks 50 disposed on either side of a large central space or corridor 528. In the embodiment shown, the first series 532 of U-banks includes five (5) U-banks—U-banks 50-1, 50-2, 50-3, 50-4 and 50-5 and similarly, the second series 536 of U-banks also includes five (5) U-banks—U-banks 50-6, 50-7, 50-8, 50-9 and 50-10. The configuration or layout of the U-banks 50, rectifier 504, corridor 528 in floorplan 524 in the embodiment depicted by FIGS. 5A and 5B provides the availability of space for the operation of high-power unipolar electrolysis plant 500, the movement of electrolyser cells 104 for maintenance around high-power unipolar electrolysis plant 500, and also the safety, to ensure there is distance between areas with high voltage in the region of the rectifiers. In any embodiment of high-power unipolar electrolysis plant 500, there are at least two U-banks, and other embodiments may have more than two U-banks or any number of U-banks greater than the ten U-banks depicted in the embodiment of FIGS. 5A and 5B. Other embodiments of unipolar electrolysis plant could have any number of series U-banks, and may be arranged in a similar or in a different fashion. In still other embodiments, each series could include a greater or lesser number of U-banks. It will also be appreciated that in some instances smaller unipolar electrolysis plants may not have their U-banks grouped in a first and second series.

Returning to the current embodiment depicted in FIGS. 5A and 5B, high-power unipolar electrolysis plant 500 includes a plurality of U-banks 50-1, 50-2, 50-3, 50-4, 50-5, 50-6, 50-7, 50-8, 50-9 and 50-10 electrically connected in series to rectifier 504 (also referred to herein as power source 504, or DC current power supply 504). (U-banks referred to herein generically, as U-bank 50 and collectively, as U-banks 50).

In the current embodiment, rectifier 504 is connected to a first U-bank 50-1 via electrical connection 540-A. First U-bank 50-1 is then connected to a second U-bank 50-2 via electrical connection 508-2. Second U-bank 50-2 is connected to a third U-bank 50-3 via electrical connection 508-3. Final U-bank 50-10 is connected to rectifier 504 via electrical connection 540-B. It will occur to a person skilled in the art that each U-bank 50-X is connected to a subsequent U-bank 50-X+1 via electrical connection 508-X, where X is the final U-bank before electrical connection 540-B. It will also occur to a person skilled in the art that this architecture and configuration of U-banks 50 is modular, expandable and scalable to any suitable size for particular applications. It will also occur to a person skilled in the art that footprint 524 is not limited to any size or any shape.

Rectifier 504 acts as a power supply, supplying DC power to U-banks 50. Rectifier 504 may receive its power from the power grid as AC power, or alternatively from other AC or DC generating power sources. Rectifier 504 may also be replaced with other DC power sources, such as solar panels, or other high current converters. Each terminal on rectifier 504 is connected to a terminal of a U-bank 50 of the same polarity through electrical connection 508. In the current embodiment, the positive terminal on rectifier 504 is connected to the positive terminal of U-bank 50-1, and the negative terminal on rectifier 504 is connected to the negative terminal of U-bank 50-10. In completing the circuit, the negative terminal of U-bank 50-1 is connected to the positive terminal of U-bank 50-2. It will occur to a person skilled in the art the connections in polarity between each U-bank 50 and rectifier 504 may occur in different configurations depending on the configurations and placements of U-banks 50. In certain embodiments, the rectifier 504 may be capable of delivering increased amperage or current to the unipolar electrolyser cells in high-power unipolar electrolyser plant 500 to make up for the loss of hydrogen production resulting from sectional maintenance. Preferably, rectifier 504 is capable of delivering between 5% and 50% more amperage or current than normal operating conditions of high-power unipolar electrolysis plant 500.

In the current embodiment depicted in FIGS. 5A and 5B, rectifier 504 is a single unit. Alternatively, a rectifier system including a group of rectifiers operating in parallel may be used to obtain the desired total current. Rectifier system can be composed of numerous parallel rectifier units with voltages between 100 and 2000 or more volts and current of 30,000 to 500,000 or more amperes.

Adjacent U-banks 50 may be arranged in any manner, but are preferably arranged in an adjacent, spaced apart, side-by-side arrangement as shown in FIGS. 3A, 3B, 5A and 5B, with one U-bank being disposed parallel or substantially parallel to the next adjacent U-bank with a service corridor 520 formed therebetween. The advantage of this arrangement is the placement of service corridor 520 between U-banks 50, allowing for maintenance of individual cell arrays 512-A and 512-B. Placing U-banks 50 adjacent to each other also allows for the consolidation of valving, input conduits and/or output conduits, which items will be described in greater detail below. The preferred dimension of service corridor 520 will be at least the size necessary for removal of a single unipolar cell 104 from the array into the corridor itself so that it can be effectively transported down the corridor. Alternatively, if a suitably designed gantry crane was placed above the specific array where the unipolar cell 104 is to be removed, corridor 520 may be narrower. The design and dimensions of service corridor 520 allows unipolar electrolysis cell 104 to be readily removed towards the outer perimeter of hydrogen plant 500.

Each U-bank 50 includes two longitudinal cell arrays 512-A and 512-B (also referred to herein as cell blocks 512-A and 512-B, or segmented cell arrays 512-A and 512-B), valving, in the nature of isolation valves 416, 420, 424, 440, and 432 (also referred to herein as valves 416, 420, 424, 440, and 432), a plurality of input conduits 408, and 412 and a plurality of output conduits 428, 436, and 444. In the current preferred embodiment, cell arrays 512-A and 512-B are arranged in a spaced apart, side-by-side arrangement, with cell array 512-A being disposed parallel or substantially parallel to cell array 512-B of the same U-bank. This allows for an additional service corridor 516 to be defined between the cell arrays 512-A and 512-B, where cell array 512-A is disposed on one side of service corridor 516, and cell array 512-B is disposed on the other side of service corridor 516. Service corridor 516 allows for ease of access to either cell array 512-A or 512-B for maintenance purposes. The preferred dimensions of the service corridor 516 are generally less than the service corridor 520, provided there is no intent to withdraw an electrolysis cell towards the central corridor 528. If the electrolyser cell 104 is to be removed to corridor 528, then the dimension of corridor 516 must be wide enough to accommodate the effective removal from the array of a water electrolysis cell (which depends on the dimensions of the water electrolysis cell plus an allowance for turning or other adjustments required during the removal or replacement process).

It will occur to a person skilled in the art that while service corridors 516 and 520 allow for access to cell arrays 512-A and 512-B on either side thereof, hence granting greater access for maintenance, access to cell arrays 512-A and 512-B may be restricted to a single side of cell arrays 512-A and 512-B, and only service corridors 516 or service corridors 520 may be present.

Cell array 512-A is electrically connected to cell array 512-B by way of an end cell array bus bar connector 404 (also referred to herein as electrical connection 404). The bus bar connector 404 connects to cell array 512-B at an end thereof opposite to the end at which the electrical connection joins cell array 512-B to cell array 512-A. In the embodiment shown in FIG. 5A, array bus bar connector 404 is along a second side of each series 532 and 536 of U-banks 50, where the first side and second side of series 532 and 536 are opposite to each other.

Each cell array 512-A and 512-B includes several unipolar alkaline water electrolyser cells 104 connected to each other electrically in series (also referred to herein as unipolar water electrolyser cell 104). Each cell array 512-A and 512-B may be configured to receive between 2 MW and 125 MW of power to produce hydrogen. In a preferred embodiment, each cell array 512-A and 512-B may include between 2 and 100 unipolar electrolyser cells. In determining the number of U-banks 50 and electrolyser cells 104, the following design considerations may be taken into account: Given that this design is appropriate for very large unipolar hydrogen plants, the preferred number of cells 104 in a U-bank 50 will equate to the total cells in the unipolar electrolysis plant 500 divided by the desired number of U-banks 50. The desired number of U-banks 50 is determined by the maximum preferred percentage of total unipolar electrolysis plant 500 which is to be sectioned off for maintenance. A large scale electrochemical process such as aluminum production is known to use a total of 2,000 volts DC across its array of cells and having cell currents at over 500,000 amperes. Large scale unipolar hydrogen plants with such capacity can be envisioned as the demand for hydrogen from water electrolysis grows. The decision by the designer, vendor or owner of the hydrogen plant 500 will determine the percentage of the plant which a sectional maintenance U-bank will be. For a non-limiting example, if the individual voltage of a single water electrolysis cell is 2 volts, then 1,000 water electrolysis cells would be required for a hydrogen plant with similar power capacity of the above mentioned aluminum plant. If the decision for sectional maintenance size is 10% of the overall production, then the resulting layout would have ten U-banks each with 100 unipolar water electrolysis cells. Each array would have 50 cells. If the center-to-center distance between adjacent cells in a single array was 1 m, the array (and hence the U-bank) would be approximately 50 m long. At 2 volts per cell, the voltage of each array would be 100 volts. From a layout 524 perspective having an even number of U-banks with an even number of cells may be optimal, though those skilled in the art could consider alternative designs with as low as three (3) U-banks. As the number of U-banks increases beyond three, the designer will find an even number of U-banks to be preferred.

In a preferred embodiment, U-banks 50 includes a first cell array 512-A and a second cell array 512-B that have the same hydrogen and oxygen production capabilities/capacities, have the same number of unipolar electrolyser cells 104, and have the same capacity for accommodating DC power. However, it will occur to a person skilled in the art that U-banks 50 may include a first cell array 512-A that differs in hydrogen production capabilities, or the number of unipolar electrolyser cells 104, or a different capacity of accommodating DC power than that of cell array 512-B.

Furthermore, in a preferred embodiment, each U-bank 50 in the same high-power unipolar electrolyser plant 500 has the same hydrogen and oxygen production capabilities/capacities, has the same number of unipolar electrolyser cells 104 in cell arrays 512-A and 512-B, and has the same capacity for accommodating DC power. In addition, in a preferred embodiment, each U-bank 50 has the same number of cell arrays. However, it will occur to a person skilled in the art that each U-bank 50 may differ in hydrogen production capabilities, or the number of unipolar electrolyser cells 104 in cell arrays 512-A and 512-B, or a different capacity of accommodating DC power, or a differing number of cell arrays.

An example of unipolar alkaline water electrolyser cell 104 can be seen in FIG. 1. Unipolar water electrolyser cell 104 receives water ($H_2O$) and DC electrical power, and will break the water ($H_2O$) into hydrogen gas ($H_2$) and oxygen gas ($O_2$) using electricity, and then discharge the hydrogen gas and oxygen gas. Unipolar water electrolyser cell 104 may also allow cooling water to flow through, to ensure that unipolar water electrolyser cell 104 stays cool during the electrolysis process. A further description of an exemplary unipolar electrolyser cell which may make up cell array 512-A or 512-B may be found in patent applications PCT/CA2021/050979 and PCT/CA2021/051240, both of which are incorporated by reference.

Figure 2:
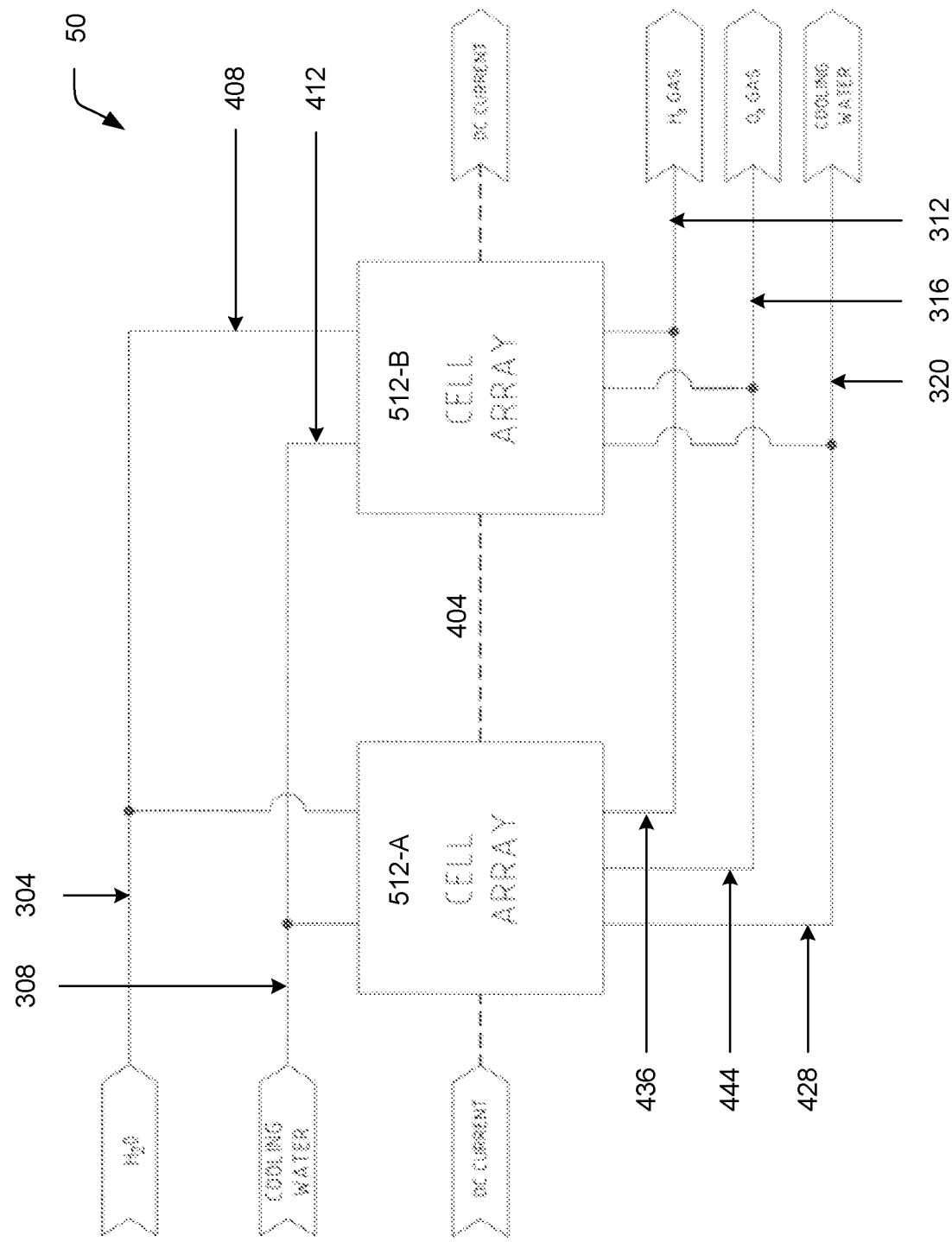
FIG. 2 depicts a block diagram of a U-bank in accordance with an embodiment of the invention, the U-bank comprising two cell arrays and the corresponding input reactants entering and resultant products leaving each cell array of the U-bank, wherein each cell array is comprised of several unipolar electrolyser cells of FIG. 1.

Referring to FIG. 2, an example U-bank 50 may be seen, where each cell array 512-A and 512-B each receive feed water through feed water input conduit 408 (also referred to herein as water input conduit 408), cooling water through cooling water input conduit 412 (also referred to herein as cold water input conduit 412) and DC electrical power to perform electrolysis. Once electrolysis has occurred, the hydrogen gas and oxygen gas produced is sent from cell arrays 512-A and 512-B through output conduits 436 and 444 respectively to be collected. Cooling water is also sent from cell arrays 512-A and 512-B through cooling water output conduit 428 to exit example U-bank 50.

Figure 4A:
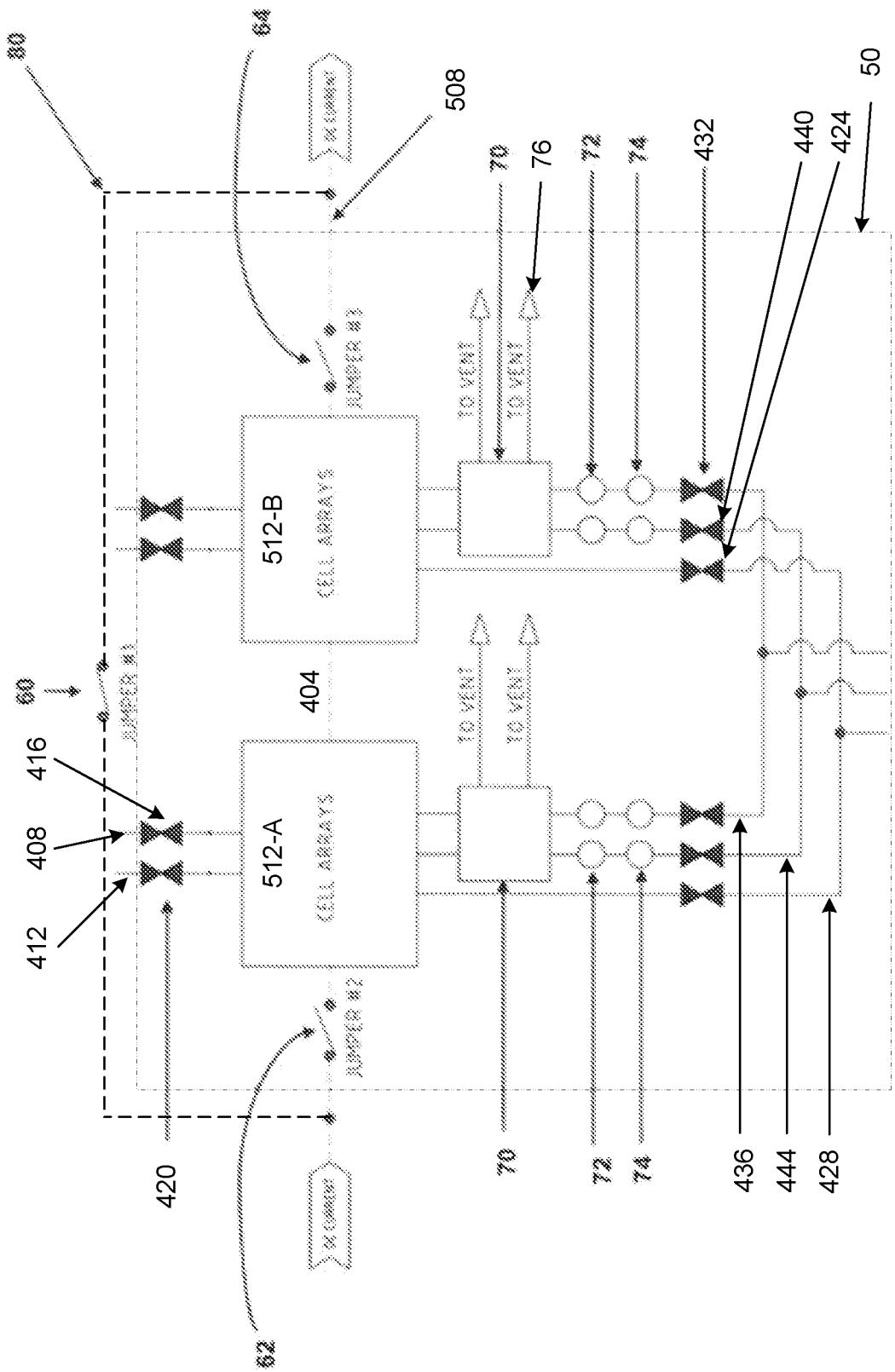
FIG. 4A depicts a block diagram of a single U-bank, with input and output conduits, valving and accessory components such as water seals (or other similar devices), mist eliminators, isotope (deuterium) enrichment columns and gas offtakes for operation within a large scale unipolar alkaline water electrolyser hydrogen production plant.

Referring to FIG. 4A, U-bank 50 also includes a plurality of input conduits and a plurality of output conduits. The input conduits include water ($H_2O$) input conduit 408 and cooling water input conduit 412. Along input conduits 408 and 412, valving, in the nature of valves 416 and 420, are present. Valves 416 and 420 control the flow of water and cooling water within their respective input conduits 408 and 412. More specifically, valve 416 controls the flow of water into cell array 512 along water input conduit 408, and may even stop the flow of water into cell array 512-A or 512-B altogether. Similarly, valve 420 controls the flow of cooling water into cell array 512-A or 512-B along cooling water input conduit 412, and may even stop the flow of cooling water into cell array 512-A or 512-B.

Output conduits include cooling water output conduit 428, hydrogen gas output conduit 436, and oxygen gas output conduit 444. Output conduits 428, 436 and 444 may include valving, in the nature of valves 424, 432 and 440. More specifically, cooling water conduit 428 may include valve 428 to control the outflow of cooling water, and may prevent cooling water from leaving U-bank 50. Similarly, hydrogen gas output conduit 436 may include valve 432 to control the outflow of hydrogen gas, and to prevent hydrogen gas from leaving U-bank 50. Oxygen gas output conduit 444 may include valve 440 to control the outflow of oxygen gas, and to prevent oxygen gas from leaving U-bank 50. Valves 432 and 440 may also prevent any reverse flow of hydrogen gas and oxygen gas returning into U-bank 50.

U-bank 50 may further include a multi purpose water seal 70, vent exhausts 76 (also referred to as gas offtakes 76), mist eliminators 72 and optional isotropic enrichment columns 74 (also referred to as isotope (deuterium) enrichment columns 74, or enrichment columns 74) and any related attachments needed for isotope enrichment. Water seal 70 or similar devices which can prevent reverse flow of gases into the U-bank from other U-banks, provide pressure balancing between oxygen and hydrogen, and provide an overpressure release mechanism for either or both hydrogen and oxygen gases leaving cell arrays 512-A and 512-B and entering the hydrogen gas output conduit 436 and the oxygen gas output conduit 444. FIG. 4A depicts a single water seal 70 for both hydrogen gas output conduit 436 and oxygen gas conduit 444. In this embodiment, water seal 70 has two separate compartments, one compartment for hydrogen gas, and the second compartment for oxygen gas. Alternatively, there may be two separate water seals, one for hydrogen gas and one for oxygen gas, leading to a water seal dedicated to hydrogen gas on hydrogen gas output conduit 436, and a water seal dedicated to oxygen gas on oxygen gas output conduit 444. U-bank 50 may further include a deuterium capture system between cell arrays 512-A and 512-B, and vent exhausts 76. Such a system may capture condensates for further deuterium enrichment from the hydrogen and/or the oxygen gases which are enriched in deuterium. Though not shown in the figures, those skilled in the art will understand additional conduits would be required for transport of the enriched deuterium into other U-banks or removal from unipolar electrolyser plant 500 to other enrichment mechanisms or as a finished product. Other such minor streams may be required including floor drains, venting systems, electrical instrumentation wires, gas analysers, and other non-limiting conduits selected by the designer for which isolation or sectional maintenance may require adjustments for isolations.

Vent exhausts 76 are located along hydrogen gas output conduit 436 and oxygen gas conduit 444, prior to valves 432 and 440, and allow for the release of the hydrogen and/or the oxygen in the event of the down stream valves 432 and 440 being closed or a blockage down stream of the water seal 70. Purge gas can also flow through the hydrogen and oxygen gas headers and be travel through the exhaust vents 76 when the downstream valves are closed. In a preferred embodiment, there may be up to four vent exhausts 76 for U-bank 50, a first vent exhaust 76 for venting oxygen from the first oxygen water seal 70 of the first cell array 512-A, a second vent exhaust 76 for venting hydrogen gas from the first hydrogen water seal 70 of the first cell array 512-A, a third vent exhaust 76 for venting oxygen gas from the second oxygen water seal 70 of the second cell array 512-B, and a fourth vent exhaust 76 for venting hydrogen gas from the second hydrogen water seal 70 of the second cell array 512-B. Purging of the gasses may be performed by closing off valves 432 and 440, and then allowing pressure to build up so that vent exhausts 76 provides a pressure relief mechanism, and emptying out hydrogen and oxygen gases from U-bank 50. The purging process may be aided by flushing out the hydrogen and oxygen gases from U-bank 50 using a purging gas. A purging gas may be introduced into U-bank 50 via a purging gas input conduit (not shown in figures).

Mist eliminators 72 are located along hydrogen gas output conduit 436 and oxygen gas conduit 444 downstream from water seal 70, and are used for removal and management of trace aerosols in the gases. In one embodiment, there may be up to four mist eliminators 72 for U-bank 50, a first mist eliminator 72 connected to the first oxygen gas output conduit 444 upstream of the second output valve 440, a second mist eliminator 72 connected to the first hydrogen gas output conduit 436 upstream of the third output valve 432, a third mist eliminator 72 connected to the second oxygen gas output conduit 444 upstream of the fifth output valve 440, and a fourth mist eliminator 72 connected to the second hydrogen gas output conduit 436 upstream of the sixth output valve 432. It will occur to a person in the art that there are different possible configurations and arrangements of mist eliminators 72 in U-bank 50.

Isotope (deuterium) enrichment columns 74 are located along hydrogen gas output conduit 436 and oxygen gas conduit 444 downstream from mist eliminators 72. In one embodiment, there may be up to four enrichment columns 74 for U-bank 50, a first enrichment column 74 connected to the first oxygen gas output conduit 444 upstream of the second output valve 440, a second enrichment column 74 connected to the first hydrogen gas output conduit 436 upstream of the third output valve 432, a third enrichment column 74 connected to the second oxygen gas output conduit 444 upstream of the fifth output valve 440, and a fourth enrichment column 74 connected to the second hydrogen gas output conduit 436 upstream of the sixth output valve 432. It will occur to a person in the art that there are different possible configurations and arrangements of isotope (deuterium) enrichment columns 74 in U-bank 50.

It will occur to a person skilled in the art that while water seal 70, vent exhaust 76, mist eliminator 72, and enrichment columns 74, remain in the same sequence along the hydrogen gas output conduit 436 and oxygen gas output conduit 444, they may occur anywhere along output conduits 436 and 444. This will be further discussed below.

Figure 3A:
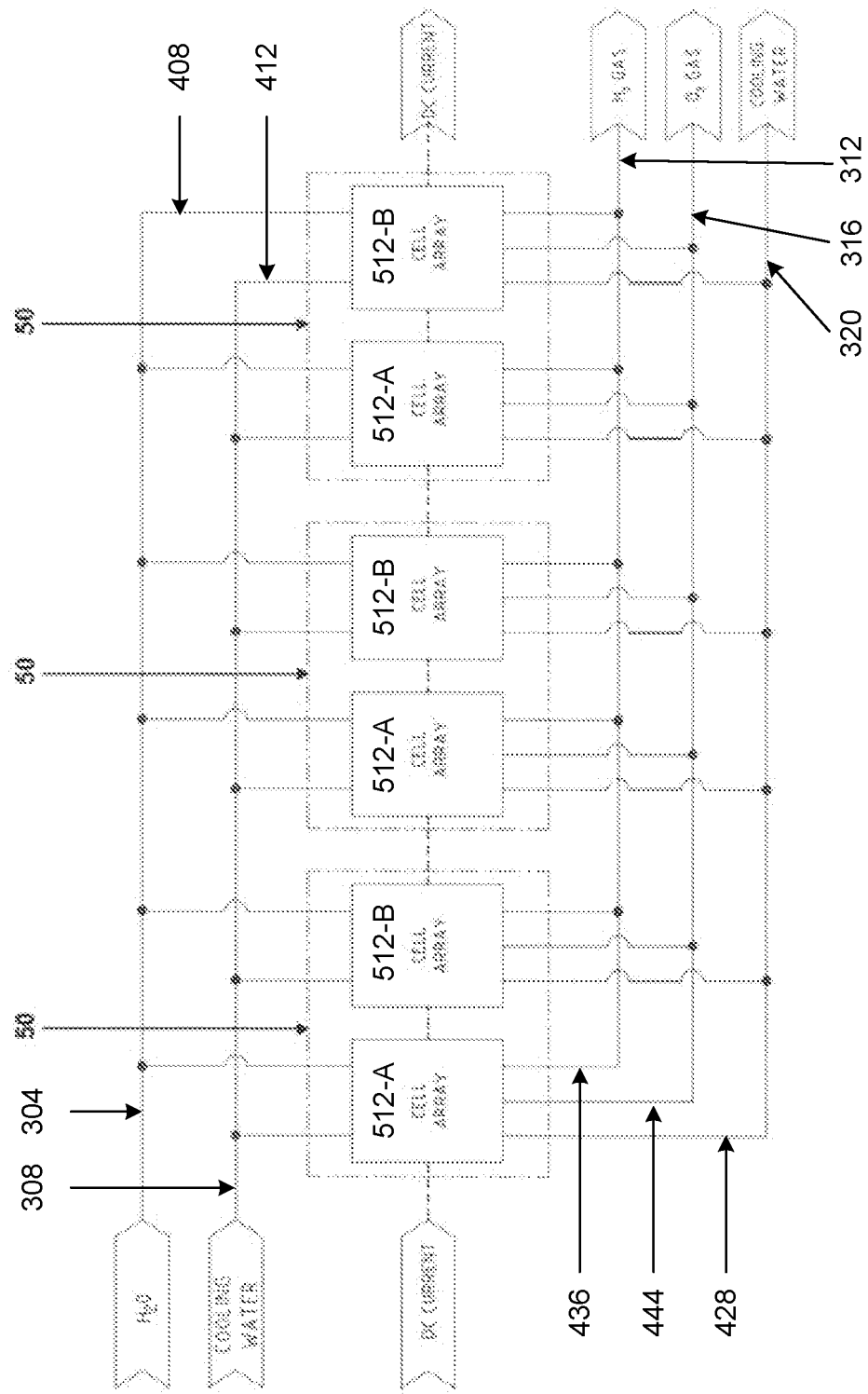
FIG. 3A depicts a block diagram modelling the arrangement of several U-banks and the corresponding pathing of input and output conduits, in accordance with an embodiment of the invention.
Figure 3B:
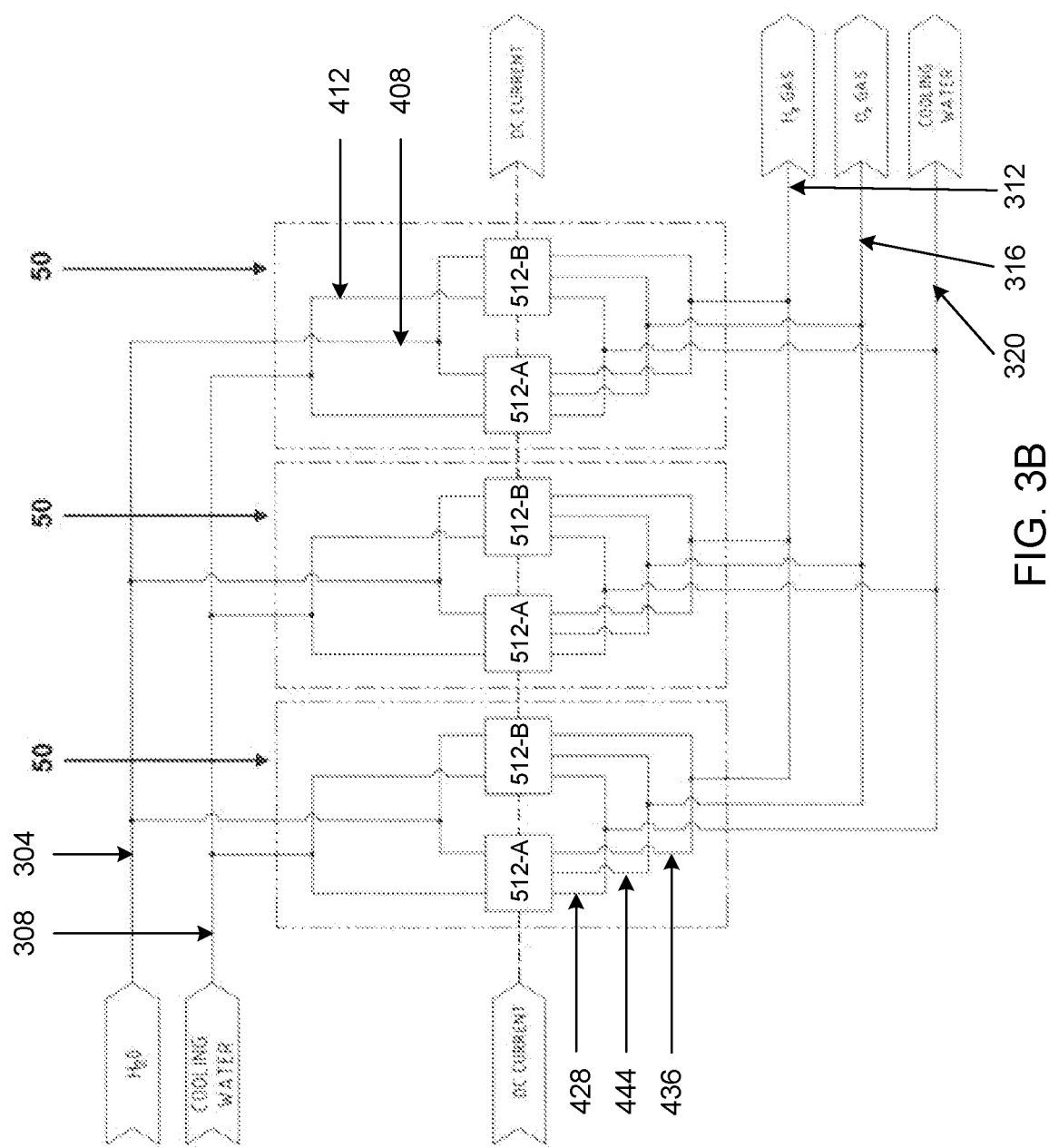
FIG. 3B depicts a block diagram modelling the arrangement of several U-banks and the corresponding pathing of input and output conduits, in accordance with an alternate embodiment of the invention.

In the embodiment shown in in FIG. 4A, input conduits 408 and 412 are provided for each cell array 512-A and 512-B within U-bank 50, and valves 416 and 420 are located on each input conduit 408 and 412 respectively. Input conduits 408 and 412 are preferably made of an insulating material to ensure electrical isolation to U-bank 50. Alternatively, the connection points between input conduits 408 and 412 and cell arrays 512-A and 512-B are made with an insulating material. In the provided embodiment, there are a total of four input conduits, two water input conduits 408, and two cooling water input conduits 412. This can also be seen in FIG. 3A, where each cell array 512-A, 512-B has its own input conduits. In alternative embodiments, there may be a single water input conduit 408 supplying U-bank 50, where the single water input conduit 408 may be split within U-bank 50 into two branches to provide water to each cell array 512-A, 512-B, as is shown in FIG. 3B. Valve 416 (not shown in FIG. 3B) may be located along single water input conduit 408 prior to the split, hence controlling the flow of water for the entire U-bank 50. Alternatively, valve 416 may be located along the branches of water input conduit 408 after the split, hence controlling the flow of water into individual cell arrays.

Similarly, cooling water input conduits 412 may have different configurations. Returning to FIG. 3A, cooling water input conduits 412 may lead to individual cell arrays 512-A, 512-B, or alternatively, as depicted in FIG. 3B, a singe cooling water input conduit 412 may supply U-bank 50, where it may be split within U-bank 50 into two branches to provide cooling water to each cell array 512-A, 512-B. Valve 420 (not shown in FIG. 3B) may be located along cooling water conduit 412 prior to the split, or may be located along the branches of cooling water conduit 412 after the split.

It will occur to a person skilled in the art that there are different configurations of input conduits 408 and 412 in U-bank 50. In addition, it will occur to a person skilled in the art that there are different configurations for water conduits and cooling water conduits leading from a water source 304 and conduits leading from a cooling water source 308, and the distribution and branching of the conduits prior to connecting to input conduits 408 and 412. For example, in the embodiment as depicted in FIG. 5A, conduits leading from a water source may be split off into two sub-conduits to supply the two columns of U-banks 50, after which the two sub-conduits may connect to the plurality of input conduits 408 supplying water to each U-bank 50.

Returning to FIG. 4A, in the embodiment depicted, output conduits 428, 436, and 444 exist for each cell array 512-A, 512-B within U-bank 50. Output conduits 428, 436 and 444 are preferably made of an insulating material, or have electrical isolation breaks, to ensure electrical isolation to U-bank 50. Alternatively, the connection points between output conduits 428, 436 and 444 and cell arrays 512-A and 512-B are made with an insulating material. Similar to the previously described embodiments of input conduits 408 and 412, output conduits 428, 436, and 444 may lead to main conduits 312, 316, and 320 collecting cooling water and the hydrogen and oxygen gas byproducts, or alternatively, output conduits 428, 436 and 444 may converge into a single output conduit for each element, and may then exit U-bank 50 into main collecting conduits 312, 316, and 320. For example, FIG. 3A aligns with FIG. 4A, in that there are output conduits 428, 436 and 444 leading away from each cell array 512-A, 512-B. More specifically, each cooling water conduit 428 leaves cell array 512-A, 512-B and U-bank 50 before joining with main cooling water output conduit 320. Each hydrogen gas output conduit 436 leaves cell array 512-A, 512-B and U-bank 50 before joining with main hydrogen gas output conduit 312. Similarly, each oxygen gas output conduit 444 leaves cell array 512-A, 512-B and U-bank 50 before joining with main oxygen gas output conduit 316. In this embodiment, water seal 70, exhaust vents 76, mist eliminators 72, isotope (deuterium) enrichment columns 74 are located on each output conduit 436 and 444 leaving cell array 512-A, 512-B, and valves 424, 432, and 440 are located on each output conduit 428, 436 and 444 leaving cell array 512-A, 512-B, prior to joining the main output conduits 312, 316, 320.

Alternatively, as depicted in FIG. 3B, output conduits 428, 436 and 444 from cell arrays 512-A, 512-B may converge prior to leaving U-bank 50 and joining main output conduits 312, 316, and 320. More specifically, cooling water output conduits 428 from each cell array 512-A, 512-B within U-bank 50 may converge into a single cooling water output conduit 428 within U-bank 50. As the single cooling water output conduit 428 departs U-bank 50, it joins with the main cooling water output conduit 320. The two hydrogen gas output conduits 436 leaving each cell array 512-A, 512-B within U-bank 50 may converge into a single hydrogen gas output conduit 436 within U-bank 50. As the single hydrogen gas output conduit 436 departs U-bank 50, it joins with the main hydrogen gas output conduit 312. Similarly, the two oxygen gas output conduits 444 leaving each cell array 512-A, 512-B within U-bank 50 may converge into a single oxygen gas output conduit 444 within U-bank 50. As the single oxygen output conduit 444 departs U-bank 50, it joins with the main oxygen gas output conduit 316. While not shown, in this embodiment, valves 424, 432, and 440 may be located either on output conduits 428, 436, and 444 leaving cell arrays 512-A, 512-B, or the aforementioned converged single output conduits 428, 436, and 444. Water seal 70, exhaust vents 76, mist eliminators 72, and enrichment columns 74 may also be located on either output conduits 436 and 444 leaving cell arrays 512-A, 512-B, or the aforementioned converged single output conduits 436 and 444, so long as they are located prior to valves 432 and 440.

It will occur to a person skilled in the art that there are different configurations and arrangements of output conduits 428, 436 and 444. Furthermore, it will occur to a person skilled in the art that there are different configurations and arrangements of water seal 70, exhaust vents 76, mist eliminators 72, enrichment columns 74 and valves 424, 432, and 440.

Different pathways for input conduits and output conduits are contemplated including multiple configurations and variations of main input and output conduits, input and output conduits leading to and from u-banks 50, and the location of flow splitters or branches leading to and from cell arrays 512-A and 512-B.

It will also occur to a person skilled in the art that different combinations of input conduits and output conduits arrangements are possible. For example, the input conduits on a number of U-banks 50 may be cell array based, whereas the output conduits on the same U-banks may converge and be U-bank based.

As previously stated, one advantage of the configuration of U-banks 50 in high-power electrolysis plant 500 is the ability to perform maintenance on cell arrays 512-A, 512-B within U-banks 50 without shutting down the entire high-power electrolysis plant 500 for the entire duration of the maintenance task. This is achieved by bypassing the identified U-bank 50 that requires maintenance and increasing the input of water through water input conduits 408 and DC power from rectifier 504 to the remaining U-banks 50 to maintain a steady output, despite the loss of a U-bank 50.

Figure 4B:
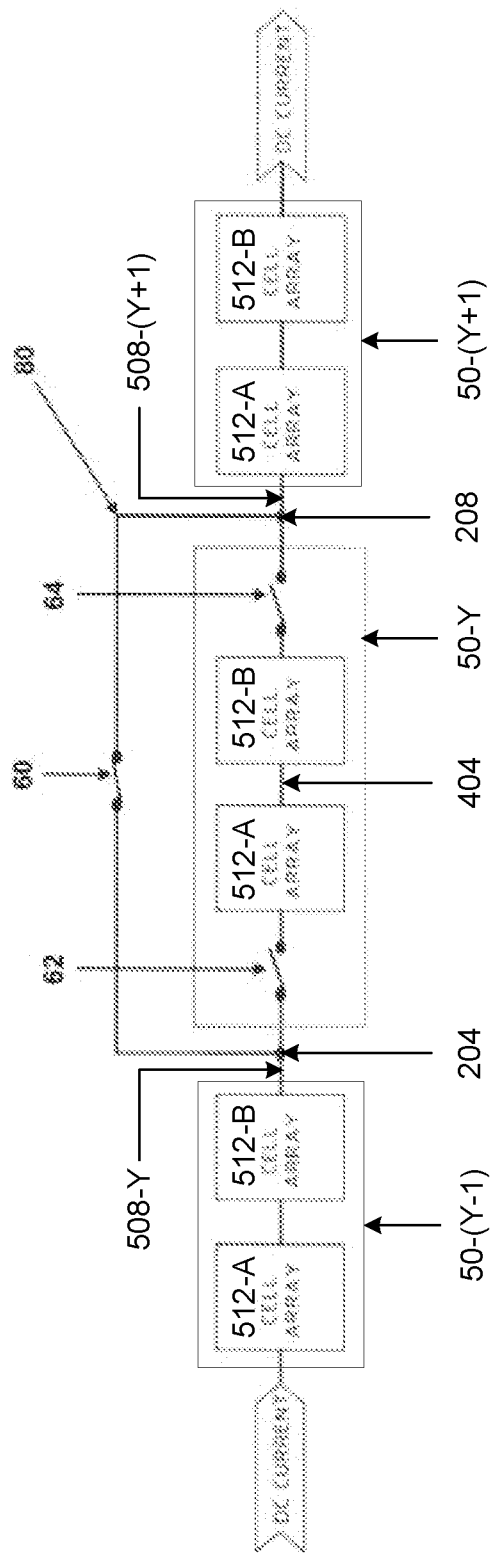
FIG. 4B depicts a block diagram showing a section of a large high-power unipolar electrolysis plant provided with three U-banks electrically connected to each other in series, the centrally disposed U-bank having an electrical bypass circuit to isolate it during maintenance, the electrical bypass connection configured to allow the U-banks on either side of the centrally disposed U-bank to continue operation while maintenance is performed on the centrally-disposed U-bank.

Referring to FIG. 4B, a section of high-power unipolar electrolysis plant 500 having three U-banks 50, is depicted. For this section, the three U-banks 50 are labeled as U-banks 50-(Y−1), U-bank 50-Y and U-bank 50-(Y+1). Electrical connection 508-Y can be seen between U-bank 50-(Y−1) and subsequent U-bank 50-Y. Electrical connection 508-(Y+1) can also be seen between U-bank 50-Y and U-bank 50-(Y+1). In the examples provided below, U-bank 50-Y is identified as requiring maintenance.

Bypass electrical connection 80 (also referred to herein as electrical bypass busbar extension 80) starts at a first isolation point 204, and ends at second isolation point 208, effectively bypassing the identified U-bank 50-Y that requires maintenance. The bypass electrical connection 80 allows DC power from rectifier 504 to be supplied to the subsequent U-bank 50-(Y+1) which does not require maintenance, and which is intended to remain operational while U-bank 50-Y being serviced. Grounding points at isolation point 204 and at isolation point 208 may be desirable or required by electric codes.

As shown in FIG. 4B, bypass electrical connection 80 further includes jumper 60 (also referred to herein as switch 60 or busbar segment 60) which allows the opening and closing of the circuit through bypass electrical connection 80, and jumpers 62 and 64 (also referred to herein as switches 62 and 64 or busbar segments 62 and 64). Jumpers 60, 62 and 64 may be made of conductive materials such as copper or aluminum (though those skilled in the art will understand alkaline electrolytes should not be allowed onto aluminum jumpers). Jumpers 60, 62 and 64 have an open position and a closed position, and may be actuated to change from the open position to the closed position, or may be actuated to change from the closed position to the open position.

Jumpers 62 and 64 are operable to cut off power to the first cell array 512-A and second cell array 512-B within U-bank 50-Y. Jumper 62 is located upstream of the first cell array 512-A of U-bank 50-Y and once operated, may electrically isolate the U-bank from the main plant bus bar at isolation point 204. More specifically, jumper 62 may electrically isolate the first electrolysis cell 104 of the first cell array 512-A. Jumper 64 is located downstream of the second cell array 512-B of U-bank 50-Y and once operated, may electrically isolate the entire U-bank from the main plant bus bar. More specifically, jumper 64 may electrically isolate the last electrolysis cell 104 of the second cell array 512-B. The operation of jumpers 60, 62, and 64 allow for the process of bypassing U-bank 50-Y. When maintenance on U-bank 50-Y is needed, jumpers of 62 and 64 may be opened, blocking DC power from continuing through the U-bank 50-Y that requires maintenance. Once jumpers 62 and 64 have been opened, jumper 60 on bypass electrical connection 80 may be closed to redirect the DC power to the subsequent U-bank 50-(Y+1), successfully isolating the U-bank 50-Y without having to discontinue operation of other U-banks 50-(Y−1) and 50-(Y+1) for a prolonged period of time.

As indicated above, jumpers 60, 62 and 64 may also be switches or busbar segments. It will occur to a person skilled in the art that there may be other apparatus to control the opening and closing of the circuit that may replace jumpers 60, 62 and 64.

FIG. 5B depicts bypass electrical connection 80 as part of high-power unipolar electrolysis plant 500. In this embodiment, the identified U-bank 50 requiring maintenance may be bypassed using bypass electrical connection 80. For a unipolar electrolyser plant 500 with numerous (e.g., more than 2 to 3) U-banks, bypass electrical connection 80 can be added from time to time to enable the isolation of a specific U-bank requiring maintenance. Alternatively, for a larger unipolar electrolyser plant 500, bypass electrical connection 80 may be built into the plant during the initial construction. As such, bypass electrical connection 80 may be temporarily placed between isolation points 204 and 208 to bypass the U-bank 50 undergoing maintenance, or bypass electrical connection 80 may be fixed between isolation points 204 and 208 and engaging jumper 64 will close the circuit enabling the bypass of the U-bank 50 undergoing maintenance. Those skilled in the art could design a suitable connection point for bypass electrical connection 80 to isolation points 204 and 208. As previously stated, the bypass electrical connection 80 enables DC power to continue along the electrical circuit to the following U-bank 50 where regular operation of electrolysis may continue. The isolated U-bank 50 may then undergo the necessary maintenance, repairs or part replacements without disruption to the remaining U-banks 50 within high-power unipolar electrolysis plant 500. Once maintenance, repairs, or part replacements are complete, the isolated U-bank 50 may be reconnected to the electrical circuit. Also, while FIG. 5B shows a single bypass electrical connection 80 for ease of illustration, in a preferred embodiment, it will be appreciated that each U-bank would have its own bypass electrical connection 80.

Figure 6:
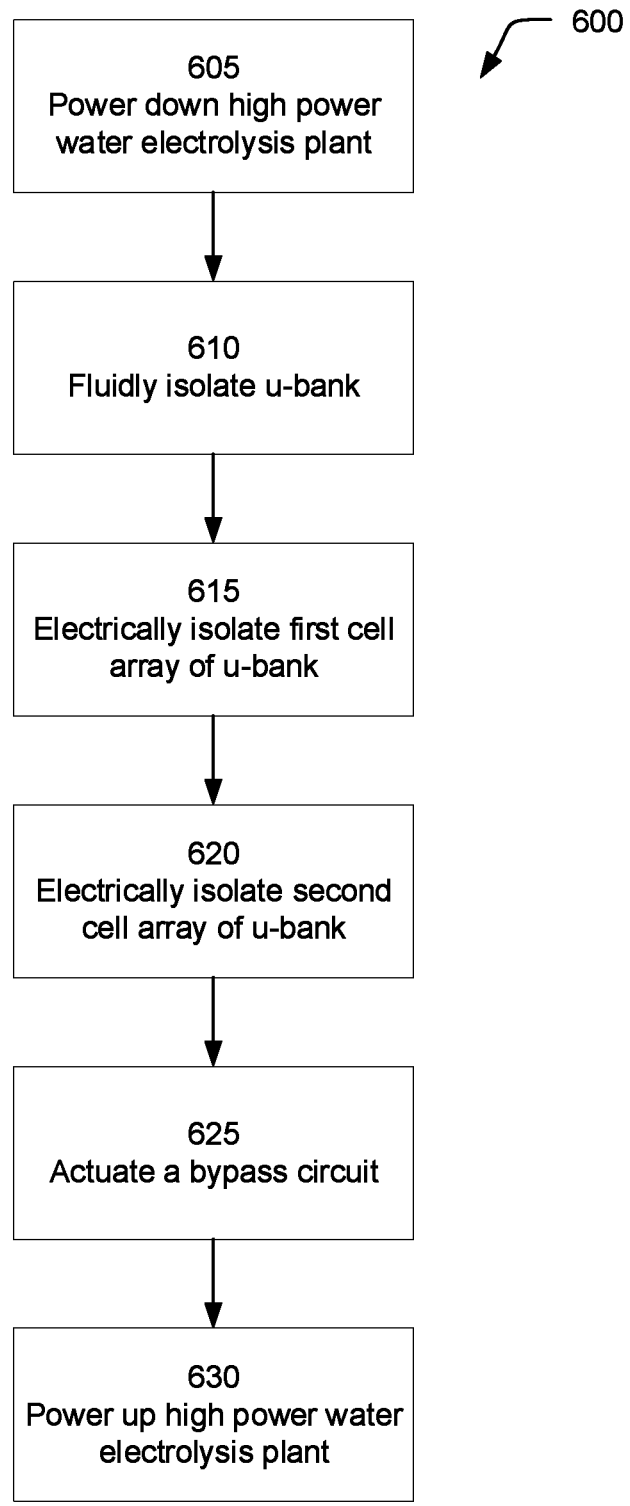
FIG. 6 is a flowchart outlining the steps of a method of isolating a U-bank and electrically bypassing said U-bank to perform maintenance on the cell arrays of said U-bank while allowing the high-power unipolar electrolysis plant and the remaining U-banks to continue operating.

FIG. 6 depicts a method 600 of bypassing a U-bank 50 for maintenance, wherein power is shut down to high-power unipolar electrolysis plant 500 for only the duration of time where the bypass electrical connection is installed.

At block 605, high-power unipolar electrolysis plant 500 is powered down. This may be done by turning off rectifier 504, and/or disconnecting rectifier 504 from its AC power source.

Once power has been shut off to high-power unipolar electrolysis plant 500, and hence to all U-banks 50, the identified U-bank 50 that requires maintenance needs to be isolated both from a fluid standpoint and electrically. Isolation is required, not only for the performance of the maintenance, but also to ensure that other U-banks 50 in high-power unipolar electrolysis plant 500 are not interrupted or disturbed.

At block 610, U-bank 50 to undergo maintenance is fluidly isolated from feed water, and cooling water inputs, and hydrogen gas and oxygen gas outputs. Fluid isolation is achieved by actuating/closing valves 416, 440 and 432. More specifically, valve 416 is closed to prevent supplying feed water to U-bank 50 through water input conduit 408, and valves 432 and 440 are closed to isolate the hydrogen and oxygen gas leaving U-bank 50 through hydrogen gas output conduit 436 and oxygen gas output conduit 444 and to prevent the backflow of gases generated by other U-banks 50 that may be in operation once the power is turned back on. Purging of U-bank 50 of any hydrogen or oxygen gas may also occur by flushing out all hydrogen and oxygen gas from U-bank 50 by introducing a purging gas to the U-bank 50 prior to the closing of valves 432 and 440, and venting hydrogen and oxygen gas out of vent exhaust 76. Those skilled in the art will understand minor custom connecting lines may also be isolated at this point.

Valves 420 and 424 may also be optionally closed to isolate U-bank 50 from cooling water. Valves 420 and 424 may be left open if it is desired to cool down the individual electrolysis cells 104 faster than they would otherwise cool down without cooling water flow. Valves 420 and 424 may then be shut down once cooling has been completed prior to maintenance commencing. Once there are no liquids or gases moving through the U-bank 50 to be maintained, it is then considered to be fluidly isolated from the remainder of high-power unipolar electrolysis plant 500.

At block 615, the first cell array 512-A of U-bank 50 to undergo maintenance is isolated electrically. Electrically isolating the first cell array 512-A of U-bank 50 is achieved by actuating/removing jumper 62 and creating an open circuit. More specifically, opening jumper 62 electrically isolates the first electrolysis cell 104 in the first cell array 512-A. Jumper 62 is located upstream of the first cell array of U-bank 50 to be isolated.

At block 620, the second cell array 512-B of U-bank 50 to undergo maintenance is isolated electrically. Electrically isolating the second cell array 512-B of U-bank 50 is achieved by actuating/removing jumper 64 and 64, hence creating an open circuit, and isolating U-bank 50 from the remainder of the high and creating an open circuit. More specifically, opening jumper 64 electrically isolates the last electrolysis cell 104 in the second cell array 512-B. Jumper 64 is located downstream of the second cell array of the U-bank 50 to be isolated.

Removing jumpers 62 and 64 can be done one after another, in either order. Once the jumpers 62 and 64 have been opened, U-bank 50 undergoing maintenance will be isolated electrically from the other U-banks 50 in high-power electrolysis plant 500.

At block 625, a bypass circuit provided to the high-power water electrolysis plant 500 is actuated. Electrical bypass busbar extension 80 acts as the bypass circuit and is attached to isolation point 204, upstream of jumper 62, and isolation point 208, downstream of jumper 64. As previously stated, in certain embodiments, electrical bypass busbar extension 80 may be moved to bypass U-bank 50 undergoing maintenance. In other embodiments, bypass busbar extension 80 is already built into high-power unipolar electrolysis plant 500, and as such may already be attached to isolation points 204 and 208. Once bypass busbar extension 80 is connected, jumper 60 may be actuated/closed, and hence closing the circuit along electrical bypass busbar extension 80. Jumper 60 cooperates with bypass busbar extension 80 to complete the circuit in high-power water electrolysis plant 500. By completing the circuit, DC current is directed away from U-bank 50 to undergo maintenance, and flows from the previous U-bank 50 (or rectifier 504 if U-bank 50 to undergo maintenance is the first U-bank 50) to the subsequent U-bank 50 (or rectifier 504, if U-bank 50 to undergo maintenance is the last U-bank 50). U-bank 50 to undergo maintenance is effectively bypassed electrically.

At block 630, high-power water electrolysis plant 500 is powered up, with the DC power redirected/bypassing the isolated U-bank 50. Maintenance may now be safely performed on the isolated U-bank 50.

Method 600 may be performed by a control mechanism with a manual disconnect switch, or may be automated with a powered switch. Alternatively, method 600 may also be performed by manually removing a section of the bus bar where the isolation is required.

As previously stated, the amount of power from DC power supply 504 may be increased to compensate for the loss in production in high power water electrolysis plant 500 following the fluid and electrical isolation of U-bank 50 to be isolated.

It will occur to a person skilled in the art hat blocks 605 to 630 are to be performed with safety protocols in mind, including, but not limited to, the grounding of any points along the circuit to ensure the safety of operators and users.

It will occur to a person skilled in the art that isolation of U-bank 50 for maintenance is not limited to a single U-bank 50. Multiple U-banks 50 may be isolated at the same time, or at different times, and high-power unipolar electrolysis plant 500 may continue to operate.

It will also occur to a person skilled in the art that once U-bank 50 has completed maintenance, it may be placed back into service in high-power unipolar electrolysis plant 500 by performing the steps in method 600 in reverse. More specifically, power is turned off to all U-banks, jumper 60 is removed from electrical bypass busbar extension 80, electrical bypass busbar extension 80 is disconnected from isolation points 204 and 208, jumpers 62 and 64 are closed to complete the circuit with U-bank 50 in serial with the remaining U-banks in high-power unipolar electrolysis plant 500, valves leading to and away from U-bank 50 are opened to allow fluid and gases to flow through U-bank 50, and power is turned on to all U-banks 50.

If incorporated, consider adjustment of the offload tap changer of the rectifier transformer to adjust DC voltage to obtain a higher power factor. For example, if 10% of the plant is isolated, then the nominal voltage from the rectifier power supply will drop by approximately 10%. An off load tap or on load tap changer covering the portion of the voltage reduced due to the removal of U-bank for sectional maintenance may be advised if the rectifier power factor is to be maintained. Additional mechanisms known by those skilled in the art of power supplies may also be implemented.

If a constant DC amperage is applied to high-power unipolar electrolysis plant 500 while any number of U-banks 50 are isolated, there will be a reduced output of hydrogen and oxygen gases or recovered isotopes due to fewer U-banks performing electrolysis. Increasing the amperage output of rectifier 504 to the remaining U-banks 50 in high-power unipolar electrolysis plant 500 may compensate for the reduced output. Increasing the amperage rectifier 504 may compensate anywhere between 5% to 50% of loss product output(s) only limited by the practical level of surplus current the water electrolysis plant can operate at. Optimization will depend upon factors such as energy efficiency of the system, The larger the plant 500 is, the more likelihood is that the increase in current may be limited to a smaller percentage of increased current such as 5% to 10%. However the larger the plant 500, the more likely that the sectional maintenance size of an individual U-bank will be to 5% to 10% of the plants capacity.

It is noted that the foregoing disclosure describes the principles of the invention as applied to unipolar water electrolysis systems, however, it will be appreciated that the principles of the invention may also be applied to monopolar water electrolysis systems to similar advantage. In such cases, unipolar water electrolysis cells could be substituted for monopolar electrolyser cells, and all features or combinations of features described in respect of the embodiments relating to unipolar water electrolysis systems could be found as well in embodiments relating to monopolar water electrolysis systems.

Although the foregoing description and accompanying drawings related to specific preferred embodiments of the present invention as presently contemplated by the inventor, it will be understood that various changes, modifications and adaptations, may be made without departing from the spirit of the invention.

The invention claimed is:

1. A method of isolating a U-bank in a high-power water electrolysis plant having a plurality of U-banks connected in series to a DC power supply; each U-bank being formed by a pair of adjacent, first and second longitudinal cell arrays electrically connected to each other and arranged in a spaced apart, side-by-side arrangement to allow sectional maintenance to be performed on each cell array; each cell array having a plurality of unipolar water electrolyser cells; the method comprising:
   powering down the high-power water electrolysis plant;
   fluidly isolating the U-bank from feed water and cooling water inputs and hydrogen gas and oxygen gas outputs;
   actuating a fluid bypass arrangement of the U-bank thereby allowing feed water and cooling water to be redirected away from the U-bank to be isolated toward the remainder of the high-power water electrolysis plant;
   electrically isolating the U-bank to be isolated;

actuating a bypass circuit provided to the high-power water electrolysis plant;

powering up the high-power water electrolysis plant thereby allowing DC current to be redirected away from the U-bank to be isolated toward the remainder of the high-power water electrolysis plant;

increasing the amount of power from the DC power supply and increasing the amount of feed water and cooling water to compensate for the loss in production in high-power water electrolysis plant following the fluid and electrical isolation of U-bank to be isolated.

2. The method of claim 1, wherein fluidly isolating the U-bank further includes closing valves on a plurality of input conduits associated with the U-bank to be isolated so as to prevent the input conduits from supplying feed water and cooling water inputs to each the U-bank to be isolated.

3. The method of claim 1, wherein fluidly isolating the U-bank further includes flushing out all hydrogen and oxygen gas from the U-bank to be isolated by introducing a purging gas to the U-bank to be isolated, and venting hydrogen and oxygen gas out of a vent exhaust.

4. The method of claim 1, wherein fluidly isolating the U-bank further includes closing valves on a plurality of output conduits associated with the U-bank to be isolated so as to prevent any backflow of hydrogen and oxygen gas through the output conduits.

5. The method of claim 1, wherein electrically isolating the U-bank to be isolated includes electrically isolating the first cell array of the U-bank to be isolated and electrically isolating the second cell array of the U-bank to be isolated.

6. The method of claim 5, wherein electrically isolating the first cell array of the U-bank to be isolated further includes actuating a first jumper connected upstream of the first cell array of the U-bank to be isolated.

7. The method of claim 6, wherein electrically isolating the second cell array of the U-bank to be isolated further includes actuating a second jumper connected downstream of the second cell array of the U-bank to be isolated.

8. The method of claim 7, wherein actuating a bypass circuit provided to the high-power water electrolysis plant further includes connecting an electrical bypass busbar extension upstream of the first jumper and downstream of the second jumper, and actuating a third jumper cooperating with the electrical bypass busbar extension to complete the circuit in the high-power water electrolysis plant.

* * * * *